March 27, 1934.   A. W. WOODWARD   1,952,404
METHOD OF MAKING VEHICLE WHEELS
Filed May 31, 1930
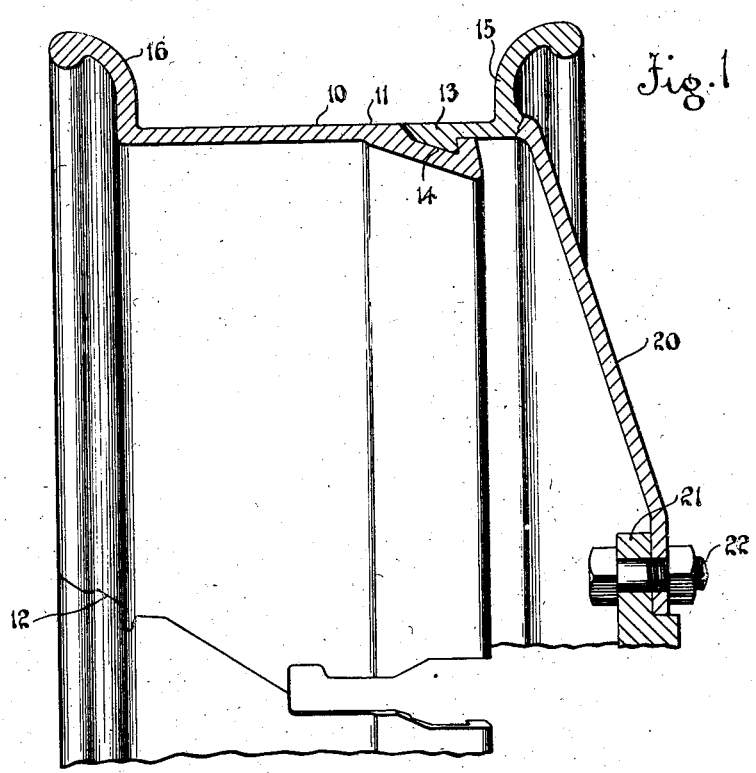
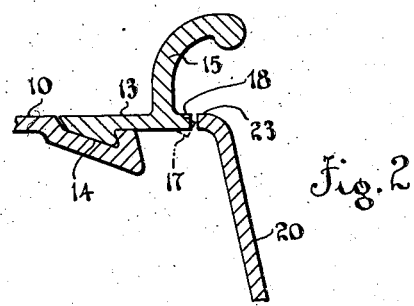
Inventor
Alva W. Woodward
By Bee & Bush
Attorneys Patented Mar. 27, 1934

1,952,404

UNITED STATES PATENT OFFICE 1,952,404

METHOD OF MAKING VEHICLE WHEELS

Alva W. Woodward, Akron, Ohio, assignor to Wingfoot Corporation, Wilmington, Del., a corporation of Delaware Application May 31, 1930, Serial No. 457,860

2 Claims. (Cl. 29—159.01)

This invention relates to vehicle wheels, and it has particular relation to a metallic disc wheel having a tire supporting rim rigidly secured to the outer peripheral edge of the disc.

One object of the invention is to provide a new and improved disc wheel having a tire-supporting rim secured thereto.

Another object of the invention is to provide a method of manufacturing a wheel comprising a disc and a tire supporting rim welded to the outer edge of the disc, which insures that the parts will be secured together in concentric and parallel relation.

Another object of the invention is to provide a novel method of manufacturing an endless rim member and a metallic web member, and subsequently welding the rim member to the web.

The invention constitutes an improvement of that embodied in my copending application relating to a vehicle wheel, Serial No. 348,478, filed March 20, 1929, and particularly is an improvement of that form of the invention illustrated by Fig. 8 of such application.

The invention is particularly adapted for practice in conjunction with a rim comprising a split base member interlocked with an endless side member in which each of the members is provided with a tire engaging flange. According to the invention, the tire engaging flange of the endless side ring is provided with an axially projecting rib, which initially is disposed obliquely to the axis of the endless member, and subsequently bent until it is disposed in an axial position. Also, a metallic web member is provided which is supported demountably by a hub. The outer peripheral edge of the web member has an axially directed portion of the same diameter as that of the rib projecting from the endless rim member. The rib on the endless rim member and the axially projecting portion of the web member are welded by any suitable butt-welding process. By providing axially directed portions on the rim and the web member, concentricity and parallelism of the rim and web member are insured during the welding operation.

For a better understanding of the invention, reference may now be had to the accompanying drawing, forming a part of this specification in which:

Fig. 1 is a fragmentary cross-sectional view of a wheel constructed according to one embodiment of the invention; and Fig. 2 is a fragmentary cross-sectional view of a rim and web member illustrating their structure prior to welding them together.

Referring to Fig. 1, a rim 10 comprises a base member 11 transversely split as indicated at 12, and an endless side member 13. The member 13 is partially disposed in a groove 14 in the split member 11, which retains the rim members assembled. A tire engaging flange 15 projects radially outwardly from the endless member 13, and, in conjunction with a corresponding flange 16 at the opposite edge of the base member 11, retains a tire mounted on the rim.

The endless member 13 preferably is formed by rolling sheet steel to desired shape between rollers particularly provided for this purpose. As shown by Fig 2, the endless member 13 initially is provided with an obliquely disposed rib 17, and in a subsequent rolling operation, the rib is rolled in an outward radial direction until it is disposed axially of the rim as indicated at 18. This process of forming the rib 18 and disposing it in an axial position, is preferred, because of difficulties of manufacture which otherwise would be encountered.

A disc or web member 20 forming part of the wheel, is rigidly secured to a hub 21 by a series of circumferentially spaced bolts 22. The outer peripheral edge of the disc, as shown best by Fig. 2, initially is provided with an axially directed portion 23, equal in diameter to the rib 18 on the endless rim member 13. It is apparent that the adjacent end surfaces of the rib 18 and the axially directed portion 23 of the disc 20 have substantially equal areas, and that the thickness of the rib 18 in a radial direction is substantially equal to that of the axially directed portion 23.

In securing the disc 20 to the endless member 13, the outer peripheral edge portion of the disc is connected to one terminal of an electrical circuit, and the endless member 13 adjacent the rib 18 is connected to another terminal of the circuit. This circuit is completed when the portion 23 of the disc is moved into engaging relation with the rib 18. The structural features of the rib 18 and the axially directed portion 23 of the disc, insure that these portions will be substantially equally resistant to the flow of current in the electrical circuit. Hence, such portions will be substantially equally heated and successful welding of the rib 18 to the disc 20 will be insured. Also, it is apparent that by providing the axially directed portions on the rim and the disc, the welding operation will not change the diameter of the latter, and, consequently, that the rim and disc may be rigidly connected without altering their concentricity. Moreover, in welding a disc to an endless rim member in the manner described, the axially directed portions thereof are melted and fused together, thereby in fact enlarging the connection between the disc and the rim. It is apparent from the finished wheel illustrated by Fig. 1, that a rigid and strong construction has been provided, and which has an appearance indicating these characteristics.

Although only the preferred form of the invention has been described and shown in detail, it will be apparent to those skilled in the art that the invention is not so limited but that various minor modifications may be made therein, without departing from the spirit of the invention or from the scope of the appended claims.

What I claim is:

1. The method of securing a tire-supporting rim to a metallic web member, which comprises providing one edge of the rim with a portion projecting at an inclination to the axis of the rim, bending such portion until it is disposed parallel to the axis of the rim, providing an axially directed portion on the wheel member of the same diameter as that of the axially directed portion projecting from the rim, and welding adjacent edges of such axially directed portions together.

2. The method of securing a tire-supporting rim to a metallic web member, which comprises providing one edge of the rim with a portion projecting at an inclination to the axis of the rim, bending such portion until it is disposed parallel to the axis of the rim, providing an axially directed portion on the wheel member of the same diameter as that of the axially directed portion projecting from the rim, and subsequently electrically butt welding the adjacent edges of such axially directed portions together.

ALVA W. WOODWARD.